: 3,110,741
CYCLOHEXANE CONVERSION TO CYCLOHEXENE

Seymour H. Patinkin, Chicago, and Robert Alois Sanford and Robert R. Chambers, Homewood, Ill., assignors, by mesne assignments, to Sinclair Research, Inc., New York, N.Y., a corporation of Delaware
No Drawing. Filed Apr. 25, 1958, Ser. No. 730,763
5 Claims. (Cl. 260—666)

The present invention relates to a process for the preparation of cyclohexene and more specifically the present invention pertains to a process wherein cyclohexane can be selectively dehydrogenated in the vapor phase to produce substantial yields of cyclohexene.

Cyclohexene is a valuable intermediate in the production of many useful organic chemicals. For instance, adipic acid, a reagent useful in the production of nylon, can be synthesized in high yields by the oxidation of cyclohexene. Also various other useful compounds such as adipaldehyde, 1,6-hexamethylene glycol, 1,2-cyclohexane glycol, etc. can be prepared by reactions involving the double bond of the cyclohexene molecule. It would therefore appear that a process enabling the efficient manufacture of cyclohexene from a readily available raw material such as cyclohexane would be eminently desirable. In the past, however, the preparation of cyclohexene by the dehydrogenation of cyclohexane has met with little success due to the fact that the extent of dehydrogenation has been at best only difficultly controllable and the reaction has proceeded to substantial completion, i.e. to the production of benzene, with little or none of the mono-olefinic compound being isolated.

Now in accordance with the present invention, we have devised a process wherein the dehydrogenation of cyclohexane can be controlled to such an extent that substantial yields of cyclohexene can be produced without the formation of excessive amounts of benzene or at least wherein the ratio of cyclohexene to benzene formation is relatively high. Briefly, the present process comprises providing both cyclohexane and sulfur in the vapor phase in a reaction zone maintained at a temperature of about 900 to 1200° F. and preferably at about 1050 to 1150° F. The cyclohexane is generally employed in the reaction zone at a liquid hourly space velocity (LHSV—volumes of cyclohexane per volume of reactor per hour) of about 1 to 20, and preferably the LHSV is about 4 to 12. The sulfur is present in the reaction zone in an amount sufficient to provide a cyclohexane to sulfur molar ratio of about 1:1 to 12:1; and preferably the sulfur is present in an amount sufficient to yield a molar ratio of about 4:1 to 6:1. When the reaction is carried out under these conditions we have found that cyclohexene is produced in good yields with relatively high cyclohexene to benzene ratios. That is, we have found that the dehydrogenation of the cyclohexane is fairly selective tending to produce substantial amounts of the mono-olefin, and that the ultimate yield of cyclohexene is high with only minor amounts of cracking taking place.

Although the conditions noted above for the sulfur-cyclohexane dehydrogenation reaction are designed primarily toward increasing the ratio of cyclohexene to benzene in the reaction product and thus giving increased recoveries of the mono-olefinic compound it is to be appreciated that substantial amounts of other potentially useful chemical compounds are also formed in the reaction and that they can be recovered by any convenient means. For instance, thiophenol is formed, in many cases in equal molar amounts with the cyclohexene, and it can be separated and recovered if desired. Also, by varying the conditions from the optimum for cyclohexene production the present method can produce larger yields of thiophenol and other useful sulfur compounds as well as provide an alternate route for the production and recovery of substantial amounts of benzene. Thus it can be seen that the present process not only can serve as a method for obtaining cyclohexene from an inexpensive raw material but it also can provide at the same time a method for the synthesis of other useful chemicals by slight variation in the reaction conditions.

The cyclohexane feedstock for the present invention can be obtained from any suitable source and can contain minor amounts of hydrocarbons other than cyclohexane if desired. Thus the cyclohexane can be obtained by various procedures such as the distillation of naturally-occurring hydrocarbon mixtures, i.e. crude oil, natural gasoline, etc. or it can be obtained from the thermal or catalytic treatment of such mixtures. The cyclohexane can also be obtained as by hydrogenating a benzene feedstock in the presence of, for instance a cobalt molybdena-alumina or platinum-alumina catalyst. Since benzene as noted above is one of the reaction products of the instant process an advantage obtains if the benzene formed in the cyclohexane conversion is recycled to a benzene hydrogenation unit and returned to the cyclohexane conversion zone as feed. The cyclohexane feedstock to the conversion zone can if desired be substituted as in the case of methylcyclohexane, decalin, etc.

The sulfur can be introduced into the reaction zone in any desired form. Thus either molten sulfur can be added or sulfur can be made in the reaction zone by the introduction of an organic, e.g. alkyl, disulfide such as for instance, t-butyl-disulfide, or various other disulfides or polysulfides. Thus, the sulfur can be introduced into the reaction zone as a compound which under the reaction conditions will liberate free sulfur in-situ, but preferably it will be introduced as a lower alkyl disulfide. If the sulfur is introduced into the reaction zone as molten sulfur we have found it advantageous that the sulfur feed system to the reactor be maintained at a temperature of less than about 320° F. since an enormous viscosity increase is noted above this temperature and the flow characteristics of the sulfur change considerably. By using an organic disulfide compound this disadvantage is surmounted by providing a normally liquid sulfur feed which can be introduced into the reaction zone without the necessity of high preheat temperatures. The sulfur in the present system apparently does not exhibit, at least not solely, a catalytic effect upon the dehydrogenation reaction but rather enters directly into the reaction resulting in the formation of hydrogen sulfide and other sulfide compounds such as thiophenols, etc.

In order to determine the effect of variables on the cyclohexane-sulfur reaction several experiments were conducted. In all of these runs the apparatus, procedure and analysis of the products were substantially as follows: The sulfur was fed from a pump, the barrel of which was heated with Nichrome wire. The sulfur was pumped through a Nichrome wire wrapped 1/4" steel tube into the top of the reactor. A steel beaker, heated by a mantle, was used as a sulfur reservoir and a cross was attached in the steel tube to which a blowout disc and pressure gauge were fitted. The barrel and lines in the sulfur feed system were maintained at approximately 310° F. The hydrocarbon was fed to the reactor from a blowcase under a nitrogen pressure. A split type furnace was placed in the hydrocarbon line just before entering the reactor since it was found that at the high space velocities the hydrocarbon should be heated above the melting point of the sulfur to avoid solidification of the sulfur in the inlet section of the reactor. The reactor with one exception was a steel reactor having sulfur and hydrocarbon feed inlet lines. In order to effect the recovery of the product a piece of ⅝" Nichrome wire wrapped steel tubing was run from the reactor outlet to a 4-liter flask immersed in a wet ice bath. The product collection system further consisted of two wet ice traps and a dry trap followed by an ascarite tube for removal of $H_2S$ and Dry Ice traps for wet gas condensation. A continuous gas sampler and a wet test meter were installed for handling dry gases. In the one exception noted (Table I, run 5) the stainless steel reactor was substituted by a quartz reactor. When the organic disulfide was fed to the reaction zone the feed inlet by-passed the heating apparatus used in the molten sulfur feed system.

In making all the experimental runs the hydrocarbon flow rates were set after all temperatures were lined out. The sulfur feed was started through the system about two minutes before the beginning of the run and the prerun effluent was collected in an alternate flask and the prerun venting system by-passed the gas collection system. At the start of each run the flasks were interchanged and the gas collection system switched in and at the end of the run the product collection flasks were again interchanged. All collection vessels were weighed before any transfers were made. The material collected in the wet ice traps was combined with the material in the product collection flask.

All runs were analyzed by distilling 500 cc. of the product in an 18-inch column, wrapped with heating tape. The product was distilled until a volume of 25 cc. or less remained as bottoms. The overhead cuts were analyzed by vapor phase chromatography (V.P.C.) and the bottoms were analyzed by infrared with the exception of the run using the quartz reactor wherein the bottoms fraction was analyzed by vacuum micro-distillation. The wet and dry gas samples were analyzed by mass spectrometry.

Using the procedure outlined above the following results were obtained for each of several runs. The conditions for each run are as indicated in the table below.

higher temperature (10.7 vs. 48.2 $C_5$). The higher ratio obtainable at the higher temperature is thus offset by the lower ultimate yields. Variations in both the space velocity of the feedstock and the ratio of feedstock to sulfur also resulted in a variation of the cyclohexene to benzene ratio. For instance, in run 3 when the cyclohexane space velocity was increased two-fold over that in run 1 with all other conditions remaining substantially the same, an increase in the cyclohexene to benzene ratio was noted (0.66 vs. 0.86) and when the ratio of feed to sulfur was increased two-fold (run 4) all other conditions remaining substantially the same as in run 3 a very notable increase in the cyclohexene to benzene ratio was obtained (0.86 vs. 2.2). In run 4, however, when the feed ratio was increased the $C_5$— production was also increased to some extent resulting in lower ultimate yields of the cyclohexene. In run 5 the stainless steel reactor described in the procedure above was substituted by a quartz reactor to determine the catalytic effect of the steel walls of the reactor. As shown, the results of run 5 are comparable with those of run 3 indicating that the reaction is not being catalyzed by the reactor walls. Run 6 shows the advantages obtainable when feeding an organic disulfide compound, in this case, t-butyldisulfide, rather than molten sulfur in the reaction zone. When using the disulfide, the ratio of the cyclohexene to benzene was increased to 2.6 which is comparable to or better than that obtained by using sulfur and increasing the feed ratio two-fold (run 4). Not only does the disulfide produce increased cyclohexene to benzene ratios but it also shows distinct advantages over increasing the feed ratio in that the extent of the $C_5$— product fraction is substantially decreased providing a higher ultimate yield of cyclohexene in the system.

Infrared analysis of runs 1 through 4 indicated that thiophenols, diphenyl sulfides and other sulfur compounds were being produced. The product from run 5 (quartz reactor) was distilled on a spinning band micro-distilla-

*Table I*

| Run | 1 | 2 | 3 | 4 | 5 | 6 [3] |
|---|---|---|---|---|---|---|
| Cyclohexane, g | 1,441 | 1,416 | 1,262 | 1,421.7 | 1,238.6 | 1,373 |
| Sulfur, g | 108.0 | 108.0 | 91.0 | 53.6 | 94.7 | 583 |
| Mole Ratio, Cyclohexane/Sulfur | 5.1/1 | 5.0/1 | 5.3/1 | 10.0/1 | 5.1/1 | 5.0/1.0 |
| Temperature, °F | 1,099 | 1,199 | 1,102 | 1,112 | 1,104 | 1,096 |
| Space Velocity of Cyclohexane, v./v./hr | 4.8 | 4.7 | 10.1 | 9.9 | 11.9–10.5 | 9.5 |
| Length of runs, hrs | 2 | 2 | 1¾ | 2 | 1¾ | 2 |
| Total Recovery, Wt. Percent [1] | 95.8 | 96.7 | 97.7 | 98.2 | [2] 99.9 | 96.7 |
| Sulfur Recovered as $H_2S$, mol. Percent | 80.1 | 84.1 |  | 67.5 | 95.2 | 75.0 |
| Conversion, [4] Wt. Percent | 10.0 | 28.4 | 8.8 | 9.1 | 8.9 | 13.0 |
| Butylene Recovery, Wt. Percent |  |  |  |  |  | 96.0 |
| Product Distribution, Wt. Percent: |  |  |  |  |  |  |
| $C_5$— | 10.7 | 48.2 | 9.5 | 20.8 | 5.9 | 4.8 |
| Cyclohexene | 22.8 | 13.7 | 27.7 | 29.3 | 26.9 | 50.7 |
| Benzene | 32.9 | 14.8 | 31.0 | 13.3 | 28.9 | 18.3 |
| Methylcyclopentane |  | 11.3 |  |  |  |  |
|  | (bottoms almost entirely thiophenol) [5] | (bottoms contain much diphenyl sulfides and other sulfides) [5] | (bottoms contain almost entirely thiophenol and sulfides) [5] | (bottoms similar to Run 2) [5] |  | 26.2 sulfur-containing products |
| Thiophenol |  |  |  |  | 25.3 |  |
| Diphenyl sulfide |  |  |  |  | 4.8 |  |
| Bottoms | 33.5 | 12.0 | 31.8 | 36.6 | 8.1 |  |
|  | 100.0 | 100.0 | 100.0 | 100.0 | 99.9 |  |
| Mole Ratio, Cyclohexene/benzene | 0.66 | 0.87 | 0.86 | 2.20 | 0.89 | 2.6 |

[1] The recovery is defined as: Organic product recovered, g./hydrocarbon feed, g.
[2] High recovery in quartz reactor is probably due to the fact that sulfur is not lost by sulfiding reactor walls.
[3] T-butyl disulfide was feed rather than molten sulfur.
[4] Conversion is defined as:

$$\frac{\text{Total weight of reactor effluent (not including } H_2S \text{ make)} - \text{weight of recovered hydrocarbon feed}}{\text{Total weight of reactor effluent (not including } H_2S \text{ make)}}$$

[5] Identification of bottoms made by infrared analysis.

Analysis of the data of Table I will reveal that at higher temperatures a slight improvement of the ratio of cyclohexene to benzene is obtainable (run 1 vs. run 2) with, however, a marked increased in cracking at the tion column with the distillation showing plateaus at the boiling point of thiophenol (337° F.) and diphenyl sulfide (564° F.). Infrared analysis of the thiophenol cuts also indicated a trace production of cyclohexyl mercaptan.

In order to determine to what extent thermal dehydrogenation played in the present process two runs were conducted. The procedures followed in both runs were substantially as outlined above with the exception that no sulfur was introduced into the reaction zone. The conditions and results of these runs are reported in Table II following.

Table II

| Run | 1 | 2 |
|---|---|---|
| Hydrocarbon Feed, Gms | Cyclohexane 716.7 | Cyclohexene 680.4 |
| Temperature, °F | 1,098 | 1,098 |
| LSHV of Hydrocarbon | 10.0 | 9.4 |
| Length of Run, Hrs | 1 | 1 |
| Total Recovery, Wt. percent | 98.8 | 98.7 |
| Conversion, Wt. percent | <1 | <1 |
| Effluent Composition, Wt. percent: | | |
| Feed | 99.53 | 99.60 |
| $C_5^-$ | | |
| Cyclo $C_6^=$ | 0.47 | |
| Benzene | | 0.40 |
| Sulfur Products | | |

Comparison of the data of Table II with run 3 of Table I shows the necessity for the inclusion of sulfur in the reaction system and that the thermal dehydrogenation of cyclohexane to cyclohexene which occurs is far insufficient to account for the products of the sulfur dehydrogenation of cyclohexane.

We claim:
1. A process for the preparation of cyclohexene which comprises reacting in the vapor phase a mixture consisting essentially of cyclohexane and free sulfur in a reaction zone at a temperature of about 900 to 1200° F., in a cyclohexane to sulfur molar ratio of about 1:1 to 12:1 and recovering substantial yields of cyclohexene without excessive amounts of benzene.

2. A process as described in claim 1 wherein the temperature is about 1050 to 1150° F., and the cyclohexane to sulfur molar ratio is about 4:1 to 6:1.

3. A process as described in claim 1 wherein the sulfur is provided by charging a lower alkyl disulfide to the reaction zone.

4. A process as in claim 1 wherein thiophenol is also produced.

5. A process as described in claim 3 wherein the lower alkyl disulfide is t-butyldisulfide.

References Cited in the file of this patent

UNITED STATES PATENTS

| | | |
|---|---|---|
| 2,288,336 | Welty et al. | June 30, 1942 |
| 2,506,416 | Gilbert et al. | May 2, 1950 |
| 2,604,438 | Bannerot | July 22, 1952 |
| 2,661,380 | Orkin | Dec. 1, 1953 |
| 2,772,315 | Hadden | Nov. 27, 1956 |
| 2,839,590 | Fetterly | June 17, 1959 |
| 2,867,671 | Mullineaux et al. | Jan. 6, 1959 |
| 2,867,677 | Murray | Jan. 6, 1959 |